United States Patent [19]

Hautala

[11] Patent Number: 5,128,030
[45] Date of Patent: Jul. 7, 1992

[54] DEVICE FOR SEPARATING SOLIDS FROM SUSPENSION

[75] Inventor: Jouko Hautala, Tampere, Finland

[73] Assignee: Oy Tampella Ab, Tampere, Finland

[21] Appl. No.: 745,953

[22] Filed: Aug. 9, 1991

Related U.S. Application Data

[63] Continuation of Ser. No. 447,760, Dec. 8, 1989, abandoned.

[30] Foreign Application Priority Data

Dec. 9, 1988 [FI] Finland ................... 885739

[51] Int. Cl.⁵ ............................................. B01D 24/44
[52] U.S. Cl. ..................... 210/108; 100/118; 100/152; 162/303; 210/350; 210/400; 210/456
[58] Field of Search ............... 100/118, 152; 162/300, 162/301, 303; 210/108, 350, 400, 401, 456

[56] References Cited

U.S. PATENT DOCUMENTS

| | | | |
|---|---|---|---|
| 1,778,342 | 10/1930 | Thompson | 100/152 |
| 1,875,075 | 8/1932 | Mason | 162/129 |
| 3,381,609 | 5/1968 | Malarkey, Jr. | 100/152 |
| 3,630,381 | 12/1971 | Gujer | 210/400 |
| 3,867,252 | 2/1975 | Skrabak et al. | 162/303 |
| 3,951,809 | 4/1976 | Kollmar | 210/400 |
| 3,998,149 | 12/1976 | Malarkey, Jr. | 100/118 |
| 4,395,331 | 7/1983 | Andersson | 210/400 |
| 4,874,468 | 10/1989 | Sbaschnigg et al. | 210/400 |
| 4,885,088 | 12/1989 | Sbaschnigg | 210/400 |

FOREIGN PATENT DOCUMENTS 2830046 3/1979 Fed. Rep. of Germany ...... 162/303

Primary Examiner—Charles Hart
Attorney, Agent, or Firm—Pollock, Vande Sande & Priddy

[57] ABSTRACT

A device for separating solids from suspension comprises two filtering belts pervious to water travelling in the same direction and arranged to be supported and guided each by their respective liquid withdrawing surfaces provided with holes which form therebetween a prefiltering chamber converging in the direction of travel. The prefiltering chamber comprises in the beginning a supply inlet for supplying suspension to be treated into the chamber, as well as sealing elements defining the chamber at its sides in directions perpendicular to the direction of travel of the belts. The sealing elements are formed by rigid walls rigidly joined to the liquid withdrawing surfaces, such that the prefiltering chamber has a substantially closed housing-like construction.

6 Claims, 2 Drawing Sheets

DEVICE FOR SEPARATING SOLIDS FROM SUSPENSION

This application is a continuation of S.N. 07/447,760, filed on Dec. 8, 1989, and now abandoned.

BACKGROUND OF THE INVENTION

The present invention relates to a device for separating solids from suspension.

The present invention is a so-called twin filtering belt press, wherein the suspension to be filtered is supplied in between two filtering belts travelling in the same direction. The filtrate becomes separated when passing through the belts and the solids in the suspension remain as solid cakes on the surfaces of the filtering belts. Finally the filtering belts are led against each other, at which stage dewatering still takes place by squeezing through the belts.

In conventional twin filtering belt presses, the open construction at the prefiltering chamber formed between the converging filtering belts has heretofore prevented the increase in velocity. For example, there are known solutions, where the filtering belts are supported on the side of the filtrate by means of rollers and edges of the belts are in this case relatively free. At the side a chamber of this type is sealed by means of wedge-like sealing strips, which are in contact with the edges of the filtering belts and hence cause wear of the belts. Further, such a relatively open construction has not allowed to use pressure in the prefiltering stage, and therefore there has not been another alternative than to construct the filtering stage to a big and expensive section.

U.S. Pat. No. 1,875,075 discloses one solution to the above-mentioned problem. However, in this construction the walls supporting the prefiltering chamber from the sides are fabricated of a resilient material, as a result of which the pressure can not be elevated in this case either. Moreover, the sealing at the exit end of the prefiltering chamber is not sufficient.

SUMMARY OF THE INVENTION

The purpose of the invention is to eliminate the drawbacks which are due to the above-mentioned technique, and to provide a solution, with the aid of which the prefiltering stage can be made more effective by utilizing the pressure. By virtue of this, the filtering can be effected on both filtering belts at equal intensity.

The aims of the present invention which are presented above are achieved with the help of a device in which due to a firm, housing-like construction of the prefiltering chamber, one can take advantage of pressure in filtering, thereby increasing the filtration rate.

According to some preferred embodiments the device may be made constructionally compact by providing the chambers collecting the filtrate coming from the prefiltering chamber, as well as the prefiltering chamber in a single, substantially closed housing-like construction. In this housing-like construction the side walls of the prefiltering chamber and the side walls of the filtrate chambers can be constituted of the same wall, and the dewatering surfaces are fixed between these walls.

According to one advantageous embodiment, the width of the dewatering area on the dewatering surfaces defining the prefiltering chamber towards the filtrate chambers and supporting the filtering belt is substantially less than the width of the filtering belt, as a result of which the solid cakes formed on the surfaces of the belts are of smaller width than the belt. This makes it possible to guide the edges of the belts against each other at the exit end of the prefiltering chamber and for realizing the same, both margin areas of the bends can be equipped with a sealing surface located at least in one of the dewatering surfaces and enabling the above-mentioned operation.

The invention will be described more closely in the following with reference to the accompanying drawings, wherein

DETAILED DESCRIPTION OF THE PREFERRED EMBODIMENTS

Figure 1:
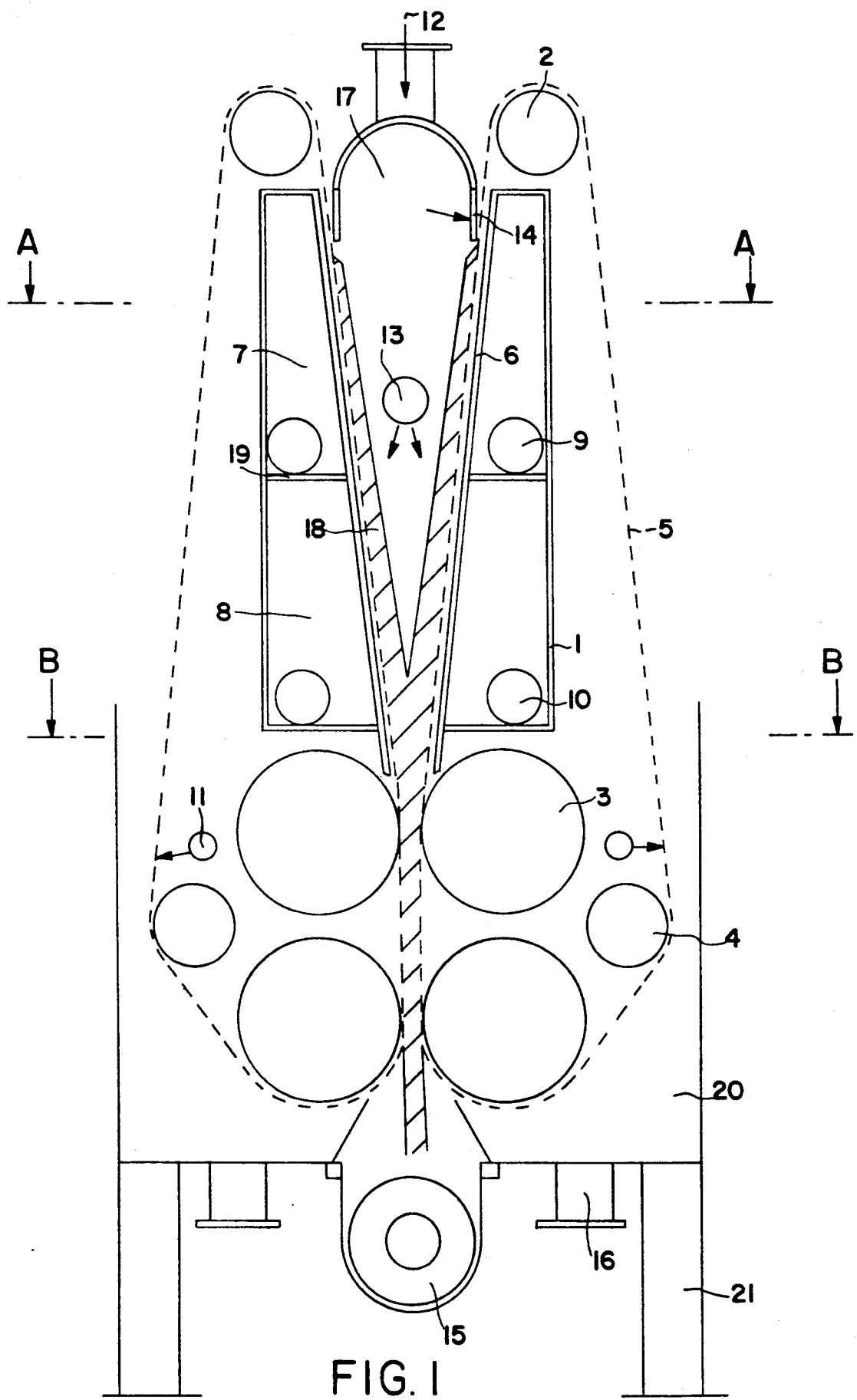
FIG. 1, is a sectional side view of a device according to the invention, the section being a longitudinal section taken in the direction of travel of the filtering belts.

FIG. 1 shows a twin filtering belt press constructed according to the invention. A mixture of solids and liquid is pumped through an inlet 12 into a prefiltering chamber 17. On the opposite walls of the chamber are located plates 6 with perforated holes or slits, which converge, in other words, the surfaces thereof form a converging chamber therebetween and they support each their respective filtering belt 5 or filtering wire, which slides along the surface of the plate towards the direction of convergence of the chamber. By virtue of the pumping pressure liquid flows first on both sides of the chamber through the wire 5 and the plate 6 into filtrate spaces 7 and 8 located on the opposite side of the plate. The spaces are located one after the other, as seen in the direction of travel of the wire, and they are separated from each other.

The prefiltering chamber 17 converges in the direction of travel of the wires in such a fashion that the cakes 18 deposited onto the surfaces of the wires start to become squeezed against each other in the end portion of the chamber and seal the chamber 17 at its exit end. This sealing effect is further ensured by strips 22, shown in FIG. 3, which press the edges of the filtering wire together before the pressing stage. The strips will be described hereinafter in more detail.

At the wider supply end of the chamber 17 there is a slit being only as large as the wire is thick and it becomes sealed under the effect of pressure when flexible sealing strips 14 extending along the width of the wires at the sides of the supply inlet are pressed against the wires 5.

Both filtering wires 5 form endless wire loops, where the wire situated within the free portion is continuously washed by means of shower tubes 11.

A partition wall 19 is located between the consecutive filtrate chambers 7 and 8. It is thus possible to withdraw from the device different filtrates having a varying degree of purity. The purest filtrate emerges as a rule from a later filtering stage. The number of filtrate chambers can be one, two or several on both sides of the prefiltering chamber 17.

The filtrate exits from the filtrate chamber 7 and 8 through filtrate outlets 9, 10. Through these outlets the chambers can be provided with reduced pressure in order to make the filtration more effective.

The cake deposited at the filtering stage is squeezed to a higher dryness by means of press rollers 3 located after the prefiltering chamber, this being done at one or several stages. After passing the press rollers 3 the cake pressed dry falls down into a conveyor 15.

The filtrate formed at the pressing stage and the wash water of the wire is collected into a basin 20 and it exits through an outlet 16.

Through an inlet 13, another material to be filtered can be pumped into the filtering chamber. This material may consist of not easily filterable solids/liquid mixtures, such as biosludge and circulation water. The solids therein will be filtered on top of a pre-coat cake being formed previously on the surface of the wire. The inlet 13 is located in the direction of travel of the wires 5 after the supply inlet 12.

The press rollers 3 mainly act as the driving rollers running the filtering wires 5. The travel of a wire is further enhanced and guided within the free section of the wires by guide rollers 4 and by so-called reversing rollers 2, which guide the free run of the wires to the beginning of the prefiltering chamber 17. The whole device, including its prefiltering chamber, filtrate chambers and rollers, is mounted on a main frame construction 21.

Figure 2:
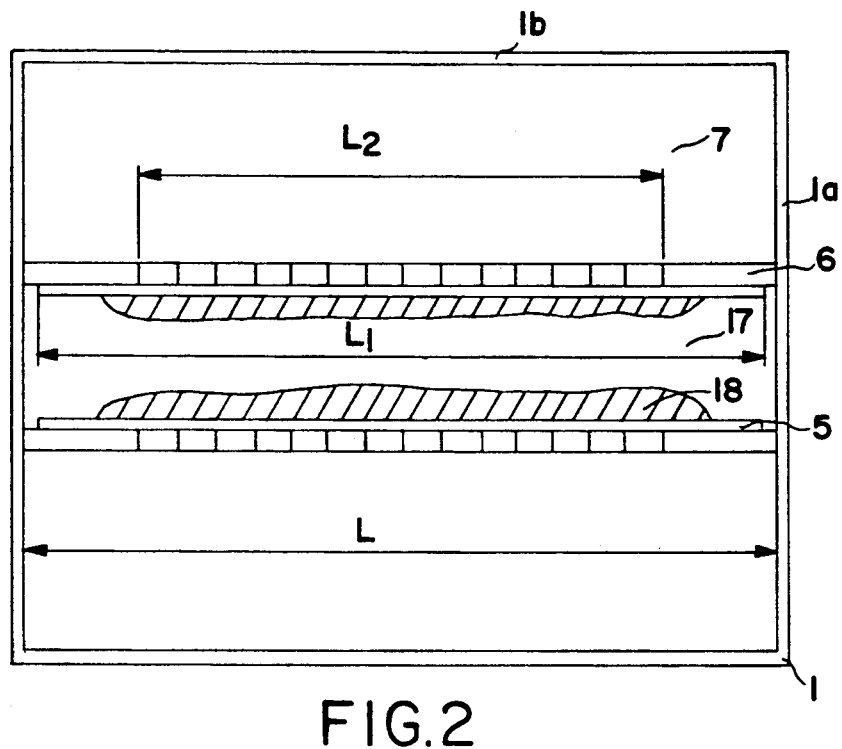
FIG. 2, is a cross-section of the device along the plane A—A of FIG. 1, and FIG. 3, is a cross-section of the device along the plane B—B of FIG. 1.

FIG. 2 shows the cross-section of the device taken along the plane A—A of FIG. 1, that is, at the location of the prefiltering chamber. The prefiltering chamber 17 and the filtrate chambers 7 and on both sides thereof are arranged in a substantially closed housing-like construction 1. The dewatering surfaces are constituted of slitted plates or plates with holes 6, along the surfaces of which the wires 5 pervious to water slide. The prefiltering chamber 17 is defined laterally, that is in the direction of the edges of the wires 5, by rigid walls 1a, which are fixedly joined to the plates 6. The edges of the wires 5 lie at a short distance from the respective wall 1a, this arrangement providing both well-sealed construction of the prefiltering chamber and a construction where edges of the wires are not subjected to wear.

Both the opposite, parallel side walls 1a for the prefiltering chamber 17 continue in the direction of the filtrate chambers 7, 8 as the same walls, which form on the side of the filtrate chambers a wall defining the filtrate chamber. The plates 6 are thus fixed between the inner surfaces of the side walls 1a of the housing-like construction 1. To these side walls 1a are perpendicularly joined rear walls 1b defining the chambers. Hence, the rigid and strong housing-like construction of a rectangular cross-section is formed, within which the prefiltering chamber 17 is situated in the above-mentioned way.

FIG. 2 further shows, how the width $L_2$ of the liquid withdrawing area on the plates 6, that is, the width of the area wherein the holes or slits are situated, is substantially smaller than the width $L_1$ of the wire 5 lying against it, in which case the edges of the wire 5 extend sideways substantially farther than the corresponding side edge of the liquid withdrawing area $L_2$ at both edges. Due to this fact the solid cakes 18 formed on top of the filtering wires 5 are slightly wider than the liquid withdrawing area $L_2$, but their width is still considerably smaller than width $L_1$ of the corresponding filtering wire 5.

The value of $L—L_1$, wherein L is the total width of the plate 6 restricted by the prefiltering chamber 17, may be 1 to 4 cm. The value of $(L_1—L_2)/2$ is preferably in the range of 5 to 15 cm, depending on the filterability of the solid cake formed by the suspension which is to filtered.

Figure 3:
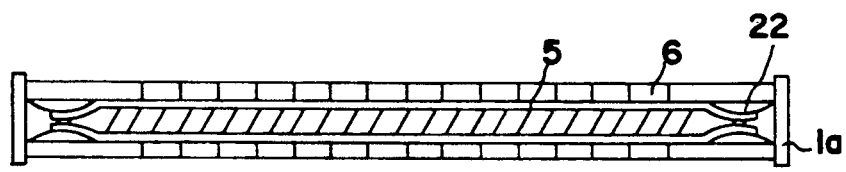

FIG. 3 shows the cross-section of the device taken along the plane B—B of FIG. 1, that is, at the location of the exit end of the prefiltering chamber, where the ends of the plates provided with holes or slitted plates 6 guide the wires 5 and the cake 18 squeezed between the wires at the exit end of the filtering chamber 17 in between the press rollers 3. In this area, both opposite plates 6 are provided with strips 22 protruding from their elsewhere flat surface and having a cross-section of a circle segment. The strips are situated laterally outside the dewatering area $L_2$, but within the width $L_1$ of the wires in both margin areas of the wire 5. The strips 22 act as sealing strips, whose arcuate surfaces raise the edges of the wires 5 off from the level of the dewatering surfaces of the plates 6 and press the edges of the opposite wires against each other at the location of the margin area of the wire situated a short distance inwardly from the outer edge of the wire 5. Because the cake formed by the cakes 18 squeezed against each other at the exit end of the prefiltering chamber 17 is of less width than the wires to a sufficient extent, it will be easily entrapped between the wires in the above-mentioned way in such a fashion that the cake does not become spread to the edges of the wires. The cake is denoted by a hatching between the wires in 5 in FIG. 3. The edges of the wires 5 can be easily guided against each other at the exit end of the prefiltering chamber 17 in the above-described fashion.

The above-described solution also affords a well-sealed construction to the exit end of the prefiltering chamber 17, because the area being subject to the filtering pressure is closed laterally as well.

FIG. 3 further shows, how within the area of the strips 22 the side walls 1a of the prefiltering chamber are rigidly fixed to the longitudinal edges of the plates 6. The strips 22 and the plates 6 supporting them continue to as close to the press rollers 3 as possible. At the rollers 3 the cake is solid to such an extent that the sealing at the sides is no more necessary.

The closed construction of the device makes it possible to design it so that it is operative in an upright position as shown in FIG. 1. The flow of the solids takes place downwards in this case, but an opposite flow direction is also possible. A horizontal construction and a horizontal flow direction are possible as well.

The invention is applicable to the filtration of all suspensions containing solid substances, such as suspensions containing fibres, also irrespective of whether the solids or the filtrate is the more valuable material to be recovered. Various waste sludges and slurries of pulp and papermaking industry can be mentioned as examples. The invention can also be used as a web forming device, the raw material of which is a fibrous suspension. After the prefiltering chamber, various aftertreatment devices and constructions well known in the art may be provided without departing from the scope and spirit of the invention.

I claim:

1. Device for separating solids from suspension in the form of a twin filtering belt press comprising:
    two filtering belts pervious to water having facing surfaces travelling in the same direction and being supported and guided each by a respective liquid withdrawing perforated surface provided with holes;

a prefiltering chamber formed between said facing surfaces of said belts, said prefiltering chamber converging in the direction of travel of said belts and having a wider end defining a supply inlet for supplying suspension to be treated into said prefiltering chamber, a narrower end forming an exit end, and side defining the prefiltering chamber in the directions perpendicular to the direction of travel of the belts, said sides including sealing elements, said sealing elements being formed by rigid side walls rigidly joined to said liquid withdrawing perforated surfaces, such that said prefiltering chamber is supported by a substantially closed rigid housing formed by said rigid walls and by said liquid withdrawing surfaces; and each said liquid withdrawing surface having a liquid withdrawing area, determined by the distribution of said holes, which is of a substantially smaller width than the width of the corresponding filtering belt in a direction perpendicular to the direction of travel of the belts such that the edges of each belt extend sideways substantially farther than the edges of the liquid withdrawing area thus forming margin areas between said edges of said belt and said edges of the liquid withdrawing area, said margin areas being free of solids collected on the belt; and wherein said exit end of said prefiltering chamber at both margin areas of the belts is provided with a sealing surface on at least one of the liquid withdrawing surfaces, said sealing surface being positioned to guide the margin area of one filtering belt against the margin area of the opposite filtering belt and said wider end being provided with flexible sealing strips are provided extending along the width of the belts and adapted for sealing said wider end of the prefiltering chamber by pressing under the effect of filtering pressure against the wires guided by said liquid withdrawing surfaces at the point where said sealing is effected.

2. Device according to claim 1, wherein said prefiltering chamber and also filtrate chambers which are formed on sides of liquid withdrawing surfaces opposite to those supporting the belts, are all arranged in said substantially closed housing.

3. Device according to claim 2, wherein said side walls of said prefiltering chamber continue in the direction of the filtrate chambers to define walls of the filtrate chambers, with said liquid withdrawing surfaces being fixed between the inner surfaces of said side walls.

4. Device according to claim 1, wherein said sealing surface is provided at least at one of the margin areas of the belts on both opposite liquid withdrawing surfaces to form protrusions extending therefrom.

5. Device according to claim 1, wherein said prefiltering chamber is provided with at least one supplementary inlet being situated in the direction of travel of the belts after the supply inlet, said supplementary inlet being introduced into the closed prefiltering chamber separately from the supply inlet through said rigid side wall of said prefiltering chamber.

6. Device according to claim 4, wherein said prefiltering chamber is provided with at least one supplementary inlet being situated in the direction of travel of the belts after the supply inlet, said supplementary inlet being introduced into the closed prefiltering chamber separately from the supply inlet through said rigid side wall of said prefiltering chamber.

* * * * *